May 24, 1927.

Re. 16,630

H. A. NORDWICK

INTERNAL COMBUSTION ENGINE

Original Filed Nov. 20, 1919 2 Sheets-Sheet 1.

INVENTOR.
Henry A. Nordwick
BY Benjamin Webster
ATTORNEY

May 24, 1927.

Re. 16,630

H. A. NORDWICK

INTERNAL COMBUSTION ENGINE

Original Filed Nov. 20, 1919 2 Sheets-Sheet 2

INVENTOR.
Henry A. Nordwick
BY
ATTORNEY

Reissued May 24, 1927. Re. 16,630

UNITED STATES PATENT OFFICE.

HENRY A. NORDWICK, OF STOCKTON, CALIFORNIA, ASSIGNOR TO DUPLEX MOTOR COMPANY, OF SAN FRANCISCO, CALIFORNIA, A CORPORATION OF NEVADA.

INTERNAL-COMBUSTION ENGINE.

Original No. 1,374,164, dated April 5, 1921, Serial No. 339,279, filed November 20, 1919. Application for reissue filed April 5, 1923. Serial No. 630,171.

This invention relates to improvements in internal combustion or gas engines, the principal object being to so design and arrange the parts of the engine, particularly one of the four cycle type, that each cylinder will have two power strokes for every revolution of the shaft so that for the same bore of the cylinders and R. P. M. of the shaft, I obtain four times the horsepower obtained with four cycle engines of the ordinary type with an equal number of cylinders, since in this type a power stroke is had only once for every two revolutions of the shaft.

This proportion of power obtains whether I construct a single or a multi-cylinder engine.

A further object is to devise an engine which will take up very little space longitudinally, in proportion to the power developed, and in which, by certain features of construction, I am enabled to combine the flywheel with the piston and cam operating means, thus doing away with a separate flywheel, and so cutting down the weight and the total number of parts used.

I also do away with the expensive forged crankshaft commonly used.

Another object is to produce a simple and relatively inexpensive engine, and yet one which will be exceedingly efficient in its operation.

The foregoing objects I accomplish by means of such structure and relative arrangement of parts as will fully appear from a perusal of the following specification and claims.

In the drawings, similar characters of reference indicate corresponding parts in the several views, in which.

Figure 1:
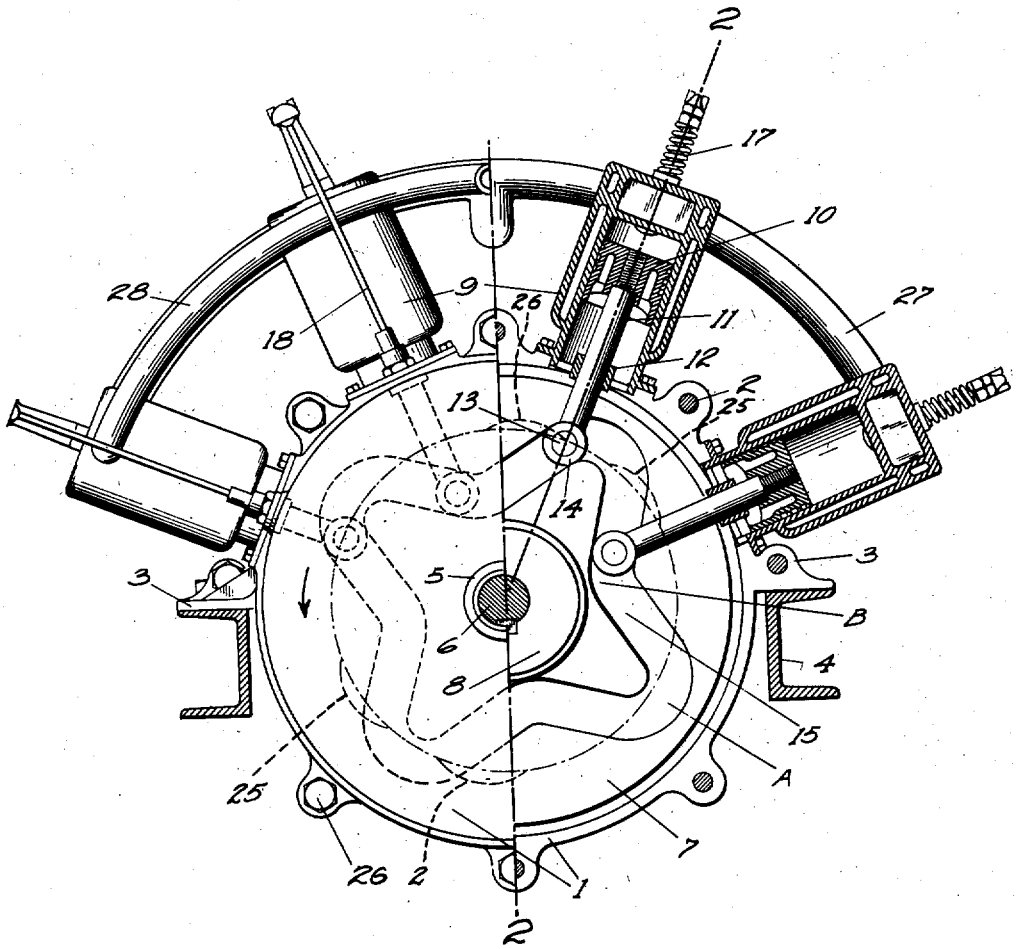
Fig. 1 is a front end elevation of my improved engine, half being in section.
Figure 2:
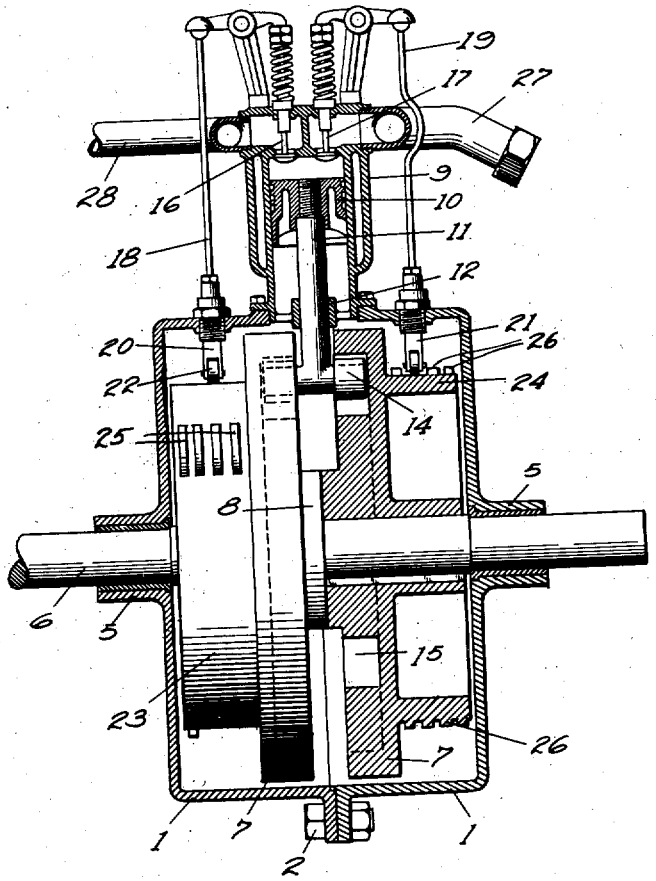
Fig. 2 is a cross section taken on a line 2—2 of Fig. 1.

Referring now more particularly to the figures of reference on the drawings, the numeral 1 denotes a cylindrical casing, preferably split on a vertical transverse center line for ease of manufacture and assembly, and connected together along this line by bolts 2. This casing is adapted to be mounted, by means of ears 3 projecting from the sides, on suitable supports 4, such as the frame of an automobile, engine bed of a boat, and the like.

Projecting centrally through the casing, and turnable in bearings 5 therein, is a shaft 6 on which inside the casing, are keyed a pair of disks 7 arranged in opposed order and spaced apart a certain distance by reason of their abutting hubs 8 projecting therebetween. Secured to the casing on the outside thereof and positioned radially from the shaft 6, are cylinders 9, whose center lines are on a vertical plane bisecting the space between the two disks 7, and which are preferably positioned at an angle of 45° to each other.

In the present instance I show and describe four cylinders, all mounted above the horizontal center line of the casing, but it will be understood that I may employ any number of cylinders from 1 to 8, without changing in any way the functioning of the engine, or the construction of the co-operating features.

Also, I have shown cylinders having overhead valves, though the L of T head construction would serve equally as well.

Pistons 10 are mounted in the cylinders, to which pistons are rigidly connected rods 11 extending radially in the direction of the shaft 6. The rods are also guided in sleeves 12 formed with or secured to the inner ends of the cylinders, the connecting members of the sleeves of course permitting a free circulation of air therepast, so as not to form a compression space between them and the pistons.

At the lower ends of the rods 11 are transverse pins 13 parallel to the shaft 6, and projecting equally on both sides of the rods. On such projecting ends are rollers 14 adapted to ride in inclosed cam grooves 15 formed in the adjacent faces of the disks 7.

In order to fulfill the conditions stated as the principal object of the invention, that is, obtaining two power strokes for each cylinder for every revolution of the shaft, the cam grooves, both of which are symmetrical, are designed in the following manner:

Each groove is substantially star-shaped, and has four points "A" adjacent the outer edge of the disk, and equally spaced apart, or 90°. When the rollers 14 are at such points in the grooves, the pistons 10 are then in their top-most position in the cylinders.

Intermediate the high or outer points "A"

are the inner or low points "B" of the groove, which are positioned centrally between the points "A." With the rollers 14 at these points, the pistons are then in their lowermost position in the cylinders, the radial distance between the points "A" and "B" being equal of course to the piston stroke.

All eight points are therefore 45° apart about the shaft as an axis, which of course totals 360°, or a complete circumference.

Therefore, since the length of a piston stroke is had during the travel of the piston rod rollers from a high point in the cam to the adjacent low point, or vice-versa, there will be eight such strokes for every revolution of the shaft, or in other words, two complete cycles of four strokes each, on which basis all four-cycle engines operate.

Each cylinder has of course intake and exhaust valves 16 and 17 respectively, and valve actuating rods 18 and 19 projecting radially toward the casing 1, being operatively connected to tappets 20 and 21 slidably and radially mounted in the casing. The tappets have rollers 22 thereon riding on the circular surface of disks 23 and 24 respectively, formed integral with and outside the disks 7, but somewhat smaller in diameter than the latter. These disks take the place of the flywheel usually supplied to give momentum and absorb vibration.

Each of the disks 23 and 24 is provided with a pair of cams 25 and 26 respectively adapted to engage the corresponding tappet roller, since as stated, each cylinder functions twice when every revolution of the shaft.

Each disk must of course be of sufficient width to accommodate four such pairs of cams, transversely, or one pair for the corresponding valve of each cylinder employed, and the valve rods and tappets properly alined with their respective cams, since the time of opening of the valves of each cylinder is different.

An exhaust manifold 27 may connect all the exhaust ports.

The ignition system of the engine I have not shown, since this may be run from the shaft and timed according to the firing strokes of each cylinder in the usual manner.

It will be evident that the same principle of operation may be employed in an engine of the two cycle type, in which case each cylinder will fire four times with every revolution of the shaft, which is still four times the power obtainable with such an engine built in the usual manner.

From the foregoing description it will be readily seen that I have produced such a device as substantially fulfils the objects of the invention as set forth herein.

While this specification sets forth in detail the present and preferred embodiment of the invention, still in practice such deviations from such detail may be resorted to as do not form a departure from the spirit of the invention, as defined by the appended claims.

Having thus described my invention, what I claim as new and useful and desire to secure by Letters Patent is:

1. A four cycle gas engine comprising a casing, a shaft turnably mounted therein, a plurality of cylinders secured to the casing in radial alinement with the shaft, pistons in the cylinders, spaced disks fixed to the shaft, means for moving the pistons in and out with the rotation of the disks, circular extensions projecting from the outer faces of the disks, each cylinder having valve tappets projecting radially toward the shaft and slidably mounted in the casing, and each tappet on a side being in offset alinement from the remainder, and cams on the extensions positioned to fit each tappet at predetermined periods in the rotation of the disks.

2. A gas engine comprising a casing, a shaft turnably mounted therein, a plurality of cylinders secured to the casing in radial alinement with the shaft and in a common plane at right angles thereto, pistons in the cylinders, spaced disks fixed to the shaft, means for reciprocating the pistons with the rotation of the disks, valve tappets projecting from the valves of each cylinder, and a separate cam for each tappet formed with the disks and arranged to lift only the corresponding tappet at a predetermined time in the rotation of said disk.

In testimony whereof I affix my signature.

HENRY A. NORDWICK.